July 24, 1956 W. W. OSBORNE 2,755,589
FISHING FLOAT
Filed Sept. 18, 1953

INVENTOR.
Wiley W. Osborne
BY
Murray, Sackhoff & Murray
ATT'YS

United States Patent Office 2,755,589
Patented July 24, 1956

2,755,589

FISHING FLOAT

Wiley W. Osborne, Fort Lauderdale, Fla.

Application September 18, 1953, Serial No. 380,947

8 Claims. (Cl. 43—15)

The present invention relates to a fishing float or bobber of the class embodying a settable spring actuated means to provide a quick acting tug on the associated fishing line close to the hook when the fish bites or nibbles at the hook on the line.

It is an object of the invention to provide an improved, easily operated and sensitively actuated device of the indicated character.

Another object of the invention is to provide a float of the indicated character which is comparatively light in weight, durable, and which may be utilized in casting with the rod and reel without danger of accidentally releasing the spring pressure of the associated mechanism.

It is a further object of the invention to provide a mechanical fish hook setting mechanism in a fishing float wherein the line of movement is concentric with the center axis of the float body and wherein the fishing line passes through the float along the center axis thereof.

A still further object of the invention is to provide a mechanism of the class described which is subject to adjustment to regulate the sensitivity of the pull required to release the mechanism to the action of the spring.

These and other important objects are attained by the means described herein and exemplified in the accompanying drawings, in which.

It is known in the art of fishing floats to provide a settable spring mechanism wherein a compression spring or tension spring is held under pressure by a latch or trigger mechanism with which the leader or hook carrying part of the fishing line is attached for release when the fish bites on the hook and the hook is thus mechanically subjected to a spring actuated tug for setting the hook in the mouth of the fish. The devices as heretofore known have been open to various objections including the fact that the latching means is not reliably secure against accidental release when the device is used in casting, or the hook end of the fishing line is out of alignment with the float when the device is set and may thereby be accidentally released due to the influence of the whip of the hook, bait and sinker in casting or throwing the line out into the water.

The device of the present invention is constructed in a simple and concentrically arranged fashion so as to obviate many of the known objections to devices of this kind.

Figure 1:
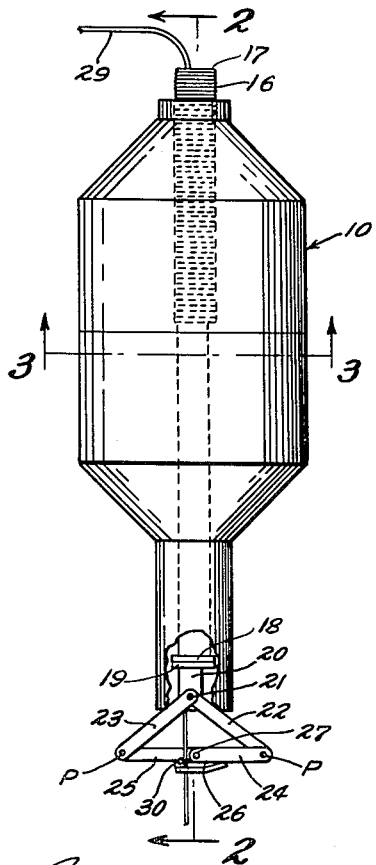
Fig. 1 is an elevational view of a device embodying the invention, partly broken away, and showing the spring actuated mechanism set against the stored compressive force of its spring.
Figure 2:
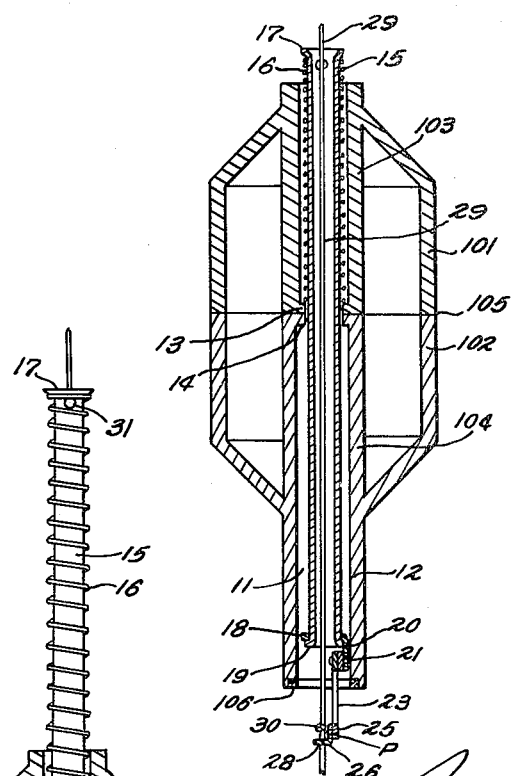
Fig. 2 is a cross sectional view taken on line 2—2 of Fig. 1.

The float of the invention comprises a buoyant and generally cylindrical body 10 having an axial bore 11 therethrough, which bore continues through a tubular extension 12 at the lower end of the body 10. The bore 11 is of a slightly greater diameter from the bottom of the stem 12 to approximately the center of the float where an annular internal shoulder 13 occurs and provides a restricted bore 14 wherein a reciprocable tubular plunger 15 takes a sliding bearing. Above the shoulder 13 the bore 11 is enlarged sufficiently to freely receive a coiled compression spring 16, the lower end of which seats upon the top of the shoulder 13. As will be readily apparent in Figs. 2 and 4 that portion of spring 16 which is within the upper end of the bore 11 also forms a sort of bearing which serves to center and reciprocably guide the plunger tube 15 in the float. At the top of the hollow plunger 15 is an outwardly turned flange 17 against which the upper and outer end of the encircling spring 16 abuts and constantly urges the plunger to the position shown in Fig. 4. Mounted on the bottom of the plunger 15 is a flat encircling ring 18 that is retained by a flange 19 formed on the lower end of the tubular plunger 15. Ring 18 has an integral downturned lug 20 which is maintained substantially within the body lines of the width of the ring and freely slidable substantially against the side wall of the bore 11, and this ring and lug are maintained against rotatable adjustment on the plunger by cutting away a portion of flange 19 to form a flat against which the lug 20 seats in a flatwise relation. Pivoted on a pin 21 fixed in lug 20 is a long link 22 and a similar companion link 23. Pivoted to the free end of link 22 is a short link 24 which lies substantially in the same plane as link 23. Pivoted to the free end of link 23 is a link 25 which lies substantially and principally in the plane of link 22. Link 25 has an extension finger 26 formed integral therewith and extending beyond the pivot 27 which connects the links 24 and 25. The finger 26 on link 25 is turned substantially at right angles to the link and has a hole 28. The assembly and disposition of the several links relative to the lug 20 and to the inside of the bore 11 of the float is such that the hole 28 in trigger finger 26 is disposed substantially concentrically with the axis of bore 11 and of the hollow interior of plunger tube 15 (see Figs. 1 and 2).

Figure 4:
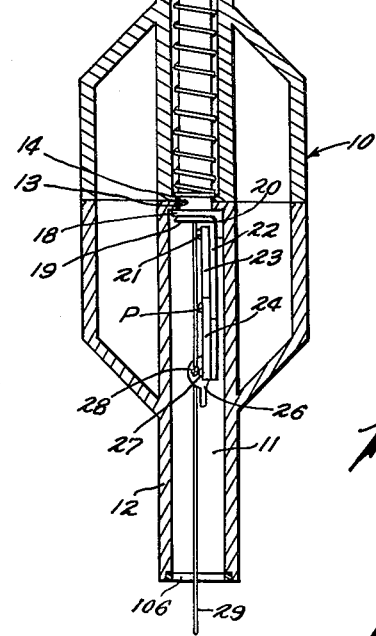
Fig. 4 is a longitudinal sectional view of the device with the mechanism in its released or inoperative position.
Figure 3:
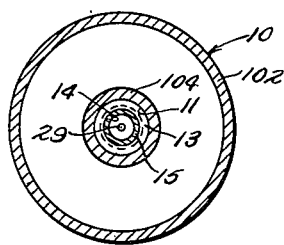
Fig. 3 is a cross sectional view taken on line 3—3 of Fig. 1.

To attach the float to a fishing line, the end of line 29 is dropped through the hollow interior of plunger 15 and then the plunger is digitally pressed against resistance of the spring 16 until the normally retracted linkage is extended outside of the hollow stem 12 whereupon the line 29 is passed through the hole 28 after forming a knot 30 in the line, which will rest on top of finger 26. The hook and sinker (not shown) would be connected in known fashion to the end of line 29 either directly or by means of a suitably fitted leader. If the manually depressed plunger is released the line and linkage will be retracted wholly within the lower half of bore 11 as illustrated in Fig. 4.

When it is desired to set the latch linkage preparatory to casting a baited hook and line along with the float into the water, the plunger 15 is depressed until the linkage protrudes from the bottom of stem 12, whereupon the finger 26 is manually pushed upwardly until links 24 and 25 are in alignment and the tip of finger 26 contacts the short link 24. As digital pressure on the top of plunger 15 is now released, the edges of links 22 and 23, together with aligned links 24 and 25 assume an isosceles triangle configuration so that the equal pressure of the spring on the two edges of links 22 and 23 is sustained by the aligned links 24 and 25 that form the base of the triangle, the end of finger 26 contacting the bottom edge of link 24 and preventing the aligned links from breaking out of alignment. When the tug on the fishing hook or line causes the knot 30 to pull the finger 26 down there is a downwardly movement of the center connecting pivot 27 of the links 24 and 25 and the latter links are pulled out of alignment causing the four links to assume the configuration of a quadrilateral which is instantaneously collapsed by the action of spring 16. The linkage instantly enters the bore 11 to a limit imposed by contact of ring 18 on the bottom face of shoulder 13. The conjoint action of the parts when the float is buoyantly supported in water admits of little or no lost-motion in the pull on the hook end of the line which will violently set the barb of the fish hook in the mouth of the fish or in a contacting part of it or any other water life which has engaged the hook sufficiently to release the trigger linkage.

The finger 26 limits movement of links 24 and 25 about the pivot 27 to substantially position the links in alignment. By bending the free end of finger 26 slightly up or down the pivot 27 may be caused to assume a position at, or above or slightly below dead center between the pivots at the remote ends of said links, and the degree of pull on the fish hook necessary to release the latch linkage may be adjusted in that manner.

The arrangement shown and described permits the line to be cast with rod and reel without danger of releasing the latch linkage, since in casting the pressure of the float on links 22 and 23 opposes the release, and in reeling in the knot 30 is pulled away from the finger 26 and the sinker or any other member near the end of the line presses against the bottom of finger 26.

For still fishing the user may employ the arrangement as heretofore described or alternatively a short piece of line may be attached through the hole in finger 26 to place the hook at a suitable depth, while the end of the long fishing line may be tied to the top end of plunger 15 after passing the line through one or both of a pair of opposed holes 31.

In the present preferred embodiment the float body 10 is formed of a pair of hollow plastic shells 101 and 102 which have integral tubular stem portions 103 and 104. The open end edges of the cup sections and stems are adhesively or otherwise secured together along a line 105 midway the ends of the float body. The sections may be of selected contrasting colors of plastic material to afford the characteristic final color decoration of the float body.

The plastic tubular stem or extension 12 has molded into the bottom edge thereof a metallic ring 106 to reenforce it and to resist wear due to the pressure of the thin edges of links 22 and 23 against the end of the stem. All of the metal parts are desirably formed of non-corroding metals.

What is claimed is:

1. In a free casting float and fishing line of the class described the combination of a float body, a spring urged tubular plunger open at both ends and reciprocable axially through the body for travelably guiding therethrough a fishing line, said plunger having a lug on the bottom end, a latch linkage pivoted to the lug and yieldably biased by the action of the spring urged plunger to a position wholly within the body, said linkage including a pair of long links pivoted at their upper ends to said lug, and a pair of short links pivoted at their upper ends to the respective lower ends of said long links, the remaining ends of the short links pivoted together, one of said short links having a laterally bent extension finger with a perforation therethrough closely adjacent the last mentioned pivotal connection for travelably guiding a predetermined unknotted length of fishing line therethrough, the extension finger having its end arranged to contact an edge of the companion short link exteriorly of the float whereby the pivots of the shorts links are held in alignment transversely of the axis of the float and the edges of the long links abut the float and retain the spring urged plunger depressed against the resistance of the spring portion thereof, the said extension being adapted to receive in abutment with its bottom face an obstruction provided on the line adjacent the hook end thereof when the fishing line is reeled in and to thereby draw the float with it and retain the linkage in a previously latched condition.

2. The combination as set forth in claim 1 wherein the perforation in the finger is retained at the axial center line of the plunger and admitting of unrestricted straight line passage of a fishing line through the axial center of said plunger and the perforation in the finger throughout predetermined limits established by said obstruction on the hook end of the fishing line below the float and the linkage and a selectively established knot in the line above the linkage for predetermining the depth setting of the hook while fishing.

3. In combination a float body and fishing line having stem portions at the top and bottom, the said float body being axially bored continuously through both stem portions, means forming an annular shoulder intermediate the ends of said axial bore, a coil spring in the upper end of the bore seating on said shoulder, an open ended tubular plunger extending through the hollow axial center of the spring and through the center of the annular shoulder for guided reciprocable axial movement in the bore and for guiding the line including a depth determining knot formed therein freely through the hollow plunger, the plunger having an external flange at the top seating on the top end of the spring whereby the plunger is urged upwardly through the bore, means on the bottom end of the plunger and engageable under the influence of the spring with the bottom of the shoulder, said means including a lug turned downwardly substantially outside the body lines of the plunger, a pair of long links pivoted together on said lug and disposed substantially to one side of the center axis of the plunger, and a pair of short links pivoted at their upper ends respectively to the lower ends of the long links, said short links being pivoted together at their remaining ends, one of said short links having an integral extension finger bent angularly to the plane of one of the short links provided with a restricted perforation for free passage of the fishing line but not said depth determining knot and having an end portion for contacting the edge of the other of the short links, intermediate the ends of the latter when the plunger is depressed against the resistance of the spring to shift the links wholly out of the bottom end of the float bore for holding the short links in transverse alignment against the spring pressure exerted by the edges of the long links on the end of the side wall of the bore.

4. In a fishing float and a fishing line a hollow body having a continuous tubular stem extending axially therethrough and below the bottom end thereof, the stem having an internal annular shoulder intermediate its ends, a coil spring seated on the top of the annular shoulder, a tubular plunger reciprocably guided through the hollow axial center of said spring and shoulder and provided with an annular flange seated on top of the spring whereby the plunger is biased upwardly out of the bore, a flange on the bottom of the plunger and having an edge portion thereof cut away to form a flat, a ring encircling the plunger above said flange and provided with a downturned flat lug seating flatwise on the cut away edge of the ring, said ring forming a stop yieldably abutting the bottom of the shoulder, a linkage assembly of normally collapsed quadrilateral formation pivoted at one corner to said lug and normally retracted wholly within the bore of the stem by the action of the spring on the plunger, the plunger being manually depressible against its spring to dispose the linkage assembly wholly outside the bottom end of the bore, the linkage assembly being depressible at the corner diagonally opposite its pivoted connection with the lug to angularly spread it adjacent the latter point into edgewise contact with the end of the stem at diametrically opposite points on the side wall of the bore and to shift the linkage into substantially triangular formation, and an integral latch finger on the linkage assembly for holding the latter formation against the resistance of the spring, said finger having a perforation therein disposed coaxial with the bore in the plunger for straight line passage of a fishing line through the tubular plunger and the perforation in the finger and to abut a knot formed in the fishing line on top of the finger whereby the latch assembly is released only by a pull on the fishing line.

5. In a float the combination of an axially bored body, a tubular plunger reciprocable therethrough, a spring urging the plunger out of the top end of the axial bore, means limiting said spring urged movement of the plunger, a pivotally connected quadrilateral linkage assembly pivotally connected at one corner with the bottom end of the plunger and retractible in collapsed condition into the interior of the bore under the influence of said spring, the plunger being manually depressible into the bore to dispose the linkage assembly outside the bore at the bottom of the float, the assembly being manually depressible to triangular formation for presenting two of its links in angular relation to each other with edges thereof contacting the bottom of the float at opposed points on the side wall of the bore, and an integral finger on one of the remaining two links for contact with the edge of the other of said last named links as said links assume a position of alignment whereby the assembly releasably retains the triangular formation against the resistance of the spring.

6. The combination as set forth in claim 5 characterized by the fact that the finger has a perforation formed therein adapted to receive a fishing line in substantially coaxial relation with the tubular plunger and whereby a knot formed in the fishing line rests on top of the finger for releasing the finger by a tug on the line thereby permitting the spring to violently enter the linkage and the fishing line coaxially into the bore in the float.

7. A free-casting float and fishing line comprising a buoyant body having an axial bore completely therethrough, a tubular plunger reciprocable in said bore, a spring in the bore surrounding said plunger and seated at one end in the upper portion of the bore and at the other end on the body of the plunger whereby the plunger is urged outwardly through the top of the bore, said tubular plunger and bore being adapted to receive the fishing line completely therethrough, and a linkage latch affixed to the lower end of the plunger and comprising linkage members arranged in a quadrilateral, one of the linkage members having a lateral extension with a hole formed therethrough for the passage of the fishing line and adapted to seat a knot formed at a predetermined distance from the end of the fishing line on the top of said lateral extension whereby the line and the knot thereon may be reeled in independently of the float.

8. A free-casting float and fishing line comprising a buoyant body having an axial bore completely therethrough, a tubular plunger reciprocable in said bore, a spring in the bore surrounding said plunger and seated at one end in the upper portion of the bore and at the other end on the body of the plunger whereby the plunger is urged outwardly through the top of the bore, said tubular plunger and bore being adapted to receive a fishing line completely therethrough, and a linkage latch affixed to the lower end of the plunger and comprising linkage members arranged in a quadrilateral, one of the linkage members having a lateral extension with a hole formed therethrough for the passage of the fishing line and adapted to seat a knot formed at a predetermined distance from the end of the fishing line on the top of said lateral extension whereby the line and the knot thereon may be reeled in independently of the float, and whereby the knot in the line determines the fishing depth below the float selected substantially without limitation.

References Cited in the file of this patent

UNITED STATES PATENTS

| | | |
|---|---|---|
| 711,318 | Hymers | Oct. 14, 1902 |
| 751,734 | Hymers | Feb. 9, 1904 |
| 2,144,175 | Zonn | Jan. 17, 1939 |
| 2,491,546 | Barnett et al. | Dec. 20, 1949 |

FOREIGN PATENTS

| | | |
|---|---|---|
| 727,867 | France | 1932 |